May 10, 1938.　　　　R. S. BASSETT　　　　2,116,592
DEVICE FOR METERING LIQUIDS
Filed Dec. 17, 1937

INVENTOR
Robert S. Bassett

Patented May 10, 1938

2,116,592

UNITED STATES PATENT OFFICE 2,116,592

DEVICE FOR METERING LIQUIDS

Robert S. Bassett, Buffalo, N. Y.

Application December 17, 1937, Serial No. 180,380

2 Claims. (Cl. 73—198)

My invention relates to a device for metering liquids which are flowing at such a low rate that they cannot be ordinarily metered by simple and inexpensive mechanical means, such as the displacement type liquid meters which are now commercially available. Among the best of such meters is the familiar nutating disc type liquid meter which, if carefully constructed, will accurately measure flows of liquids such as fuel oil, at flows having a rate as low as three gallons per hour or as high as twenty gallons per minute.

The object of my invention particularly is to measure flows of liquid which must be discharged from the measuring device slowly and uniformly at flow rates which will ordinarily be between one-half and two and one-half gallons per hour. Such flows do not develop enough power to continuously overcome the running friction of displacement type liquid meters. This friction loss however, can be minimized if only operative during a part of the flow cycle. A particular application of my device is to the measurement of fuel oil consumed by small oil burners used especially for house heating purposes. The supply of oil to the oil burner when burning must be steady and constant and is usually at a flow of approximately two gallons per hour. My device is especially suited for the metering of such slow flowing liquid, but its maximum capacity is substantially that of the liquid meter which is used as a part of the device, as shown in the illustrations and the description.

Another object of my invention is to prevent the escape of explosive fumes from tanks and chambers containing the oil. In my construction I show the use of air under pressure, which is advantageous to force thick oil through restricted piping where gravity flow might be at too slow a rate.

To illustrate more clearly the application of my invention I shall describe its particular use in connection with small oil burners.

Figure 1:
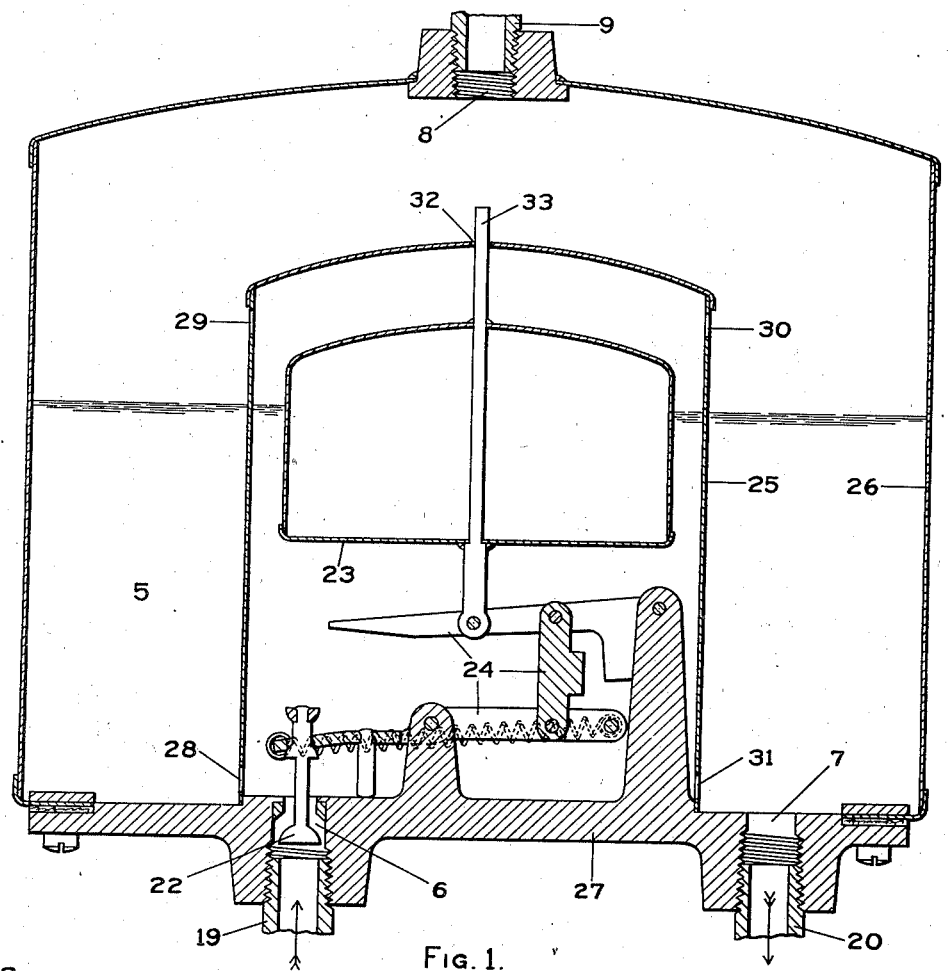
Figure 1 is a vertical sectional view through the accumulator chamber and shows the location of the openings and the interior mechanism.
Figure 2:
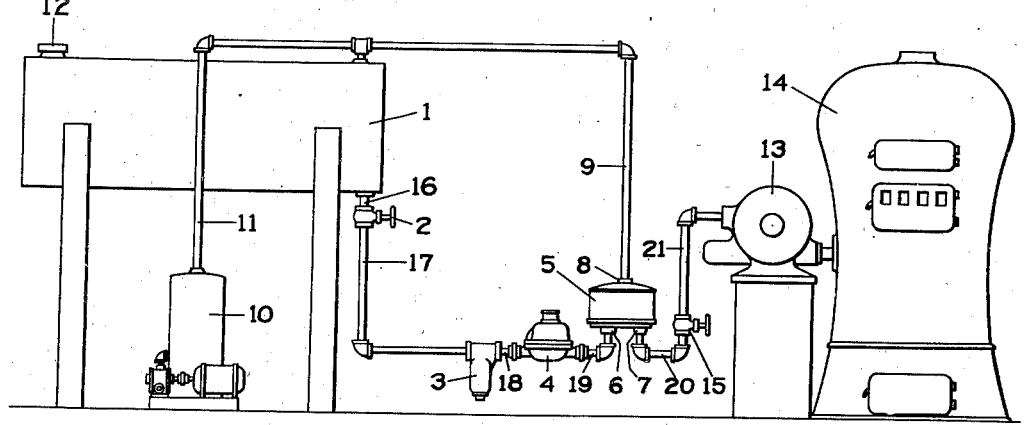
Figure 2 is an exterior side view of my device, as installed with a typical house heating furnace fitted with a fuel oil burner.

Referring to the drawing in detail, 1 is a tank serving as the oil supply container. 2 is a shut-off valve on the discharge line from supply container 1. 3 is a trap strainer of the usual type which is required on such installations to remove impurities from the oil before it enters the other apparatus. 4 is any suitable liquid meter and is shown as the familiar displacement type nutating disc liquid meter. 5 is the accumulator chamber with inlet 6, outlet 7 and vent opening 8. 9 is piping means leading from accumulator chamber 5 to the top of supply container 1. 10 is a source of compressed air of any conventional type, one of which is shown on the illustration. 11 is piping means to convey the compressed air from its source 10 to the top of supply container 1, so that, when arranged as shown in my drawing, supply container 1 and accumulator chamber 5 are both under air pressure, which would speed up when desired the flow of the oil out through outlet 7. 12 is the filling opening for supply container 1 and is shown of the capped-over type, to prevent the escape of the compressed air within supply container 1. 13 is a fuel oil burner of the usual type, installed so as to heat a furnace 14, which is shown of the house heating type. 15 is a shut-off valve on the outlet line from accumulator chamber 5. 17, 18, 19, 20 and 21 are piping means, connecting the previously mentioned units as indicated in the drawing.

Accumulator chamber 5, as shown in Figure 1, has in its inlet 6 a valve 22 and also comprises float 23, which is operatively connected to valve 22 by snap action toggle mechanism 24, which is shown of a conventional type. Accumulator chamber 5 has its interior space divided into two parts. Float compartment wall 25 encloses float 23 to form a float compartment, while outer wall 26 together with float compartment wall 25 form an outer storage compartment between them. Accumulator chamber base 27 closes off the lower end of the chamber to complete the enclosure of the float chamber compartment and the storage chamber compartment. 28, 29, 30 and 31 are openings in float compartment wall 25, to allow the flow of liquid into the storage compartment. This segregation of the float in a separate float compartment eliminates wear on the float and its connecting mechanism, because surges of the liquid and vibration affecting the liquid in the storage compartment are not transmitted to the float, thereby eliminating valve chatter and consequent wear. As my measuring device is suitable for installation on moving bodies such as boats and automobiles, this protection and stabilization of the liquid surrounding the float is a valuable feature and one not hitherto available in accumulator chambers of this exact type.

Valve 22, as shown in the drawing, is wide open when float 23 is at its lower position with the level of the liquid within the chamber at a low point. When the liquid level within the chamber reaches a higher point as the chamber fills with liquid, float 23 moves upward and through toggle mechanism 24 finally closes valve 22. A snap action float control valve can be constructed in many ways, and I am not limiting the mechanism of the construction to the exact construction shown in the drawing which is only one of a number of different types which can be used. The essential feature of the snap action is that the valve is suddenly opened wide, when the float reaches its lowest point of travel, and is similarly suddenly closed, when the float reaches its uppermost point of travel.

Outlet 7 from accumulator chamber 5 is shown leading from the storage compartment between wall 25 and wall 26, as is also the case of vent opening 8, which normally allows the passage of air to and from chamber 5. It should be noted that piping means 9, which is attached to vent 8, does not lead directly out of the float compartment enclosed within float compartment wall 25. The pressure within the float compartment fluctuates up and down slightly, as the fluids flow in and out of openings 28, 29, 30 and 31, so that for a considerable part of the flow cycle there is a slight difference in the pressure within the float chamber compartment and the storage compartment portions of accumulator chamber 5. Vent opening 8 from the storage compartment is not a direct vent from the segregated float compartment, for reasons as explained above. In my invention, I have shown a novel construction for the accumulator chamber by providing an inner float compartment and an outer storage compartment. Float compartment wall 25 also has in it an opening 32 which serves as a guide means for float stem 33, a distinctive feature of my construction, which allows wall 25 to serve a duel purpose.

I have described in detail the action within accumulator chamber 5, which is used as an accumulator with a meter to act in a general way as covered in earlier patents showing the accumulator principle. This action, while well understood, consists essentially of the oil in accumulator chamber 5 running slowly to burner 13, as required for combustion. When there is only a small quantity of oil left within chamber 5, float 23 opens valve 22, allowing a sudden inrush of oil from supply container 1 through meter 4. This flow of oil to fill chamber 5 is at a rate far in excess of that of the flow to the burner itself. Under ordinary installation conditions with the bottom of container 1 elevated a couple of feet above chamber 5, this flow is around 60 gallons per hour, which is more than ample to operate meter 4 at a speed at which it will measure very accurately.

In passing one gallon of oil through the system, the meter is operated for approximately one minute only, while it will take approximately 30 minutes for this one gallon of oil to be used by the oil burner. In this way the friction of the meter must be overcome during only one-thirtieth of the time that the burner requires to use the oil, so that the power available to operate the meter is thirty times that which it would be if the energy from the downward movement of the oil were distributed uniformly over the entire period of flow to the burner.

The essential elements of a measuring device with an accumulator are a storage reservoir on the outlet line from the meter between the meter and liquid consuming means, a quick acting valve controlling an intermittent flow to the reservoir and located between the reservoir and the meter, together with means to open said valve suddenly, when the supply of said liquid within said reservoir approaches its minimum, and to close said valve suddenly when the supply of liquid within said reservoir approaches its maximum.

My invention, however, does not cover the basic principle of the accumulator and meter combination, but covers improvements in the accumulator to perfect its action. I have also shown the use of a piping means connecting chamber 5 with container 1, so that these two at their uppermost points are always under the same air pressure, irrespective of the absolute value of said air pressure, which as shown in my drawing is considerably above atmospheric, so as to facilitate the flow of the oil from chamber 5 to burner 13.

My invention is novel in respect to the provision for air pressure on the entire system, as hitherto accumulator chambers were frequently inoperative unless the explosive gases within the chamber were vented freely from the float compartment direct to the surrounding atmosphere. In my invention I have shown how it is possible to confine these fumes entirely throughout the flow cycle.

While in some installations the oil would flow from outlet 7 to fuel oil burner 13 by gravity, nevertheless in many installations, such as the one shown in my drawing, there is very little, if any, drop from the bottom of supply container 1 to burner 13. As I have stated above, the bottom of container 1 should be a couple of feet higher than chamber 5, so that the flow from container 1 through meter 4 will be at a sufficiently high rate to operate the meter at a speed at which it will measure accurately. There must be a reasonable liquid head to make this flow high enough. With accumulator chambers having a direct atmospheric vent from the float compartment, the flow from the chamber to the fuel oil burner must be by gravity, so that with previously used mechanisms it is necessary to have the accumulator chamber mounted higher than the burner. As it is also necessary to mount the accumulator chamber below the supply container, it is self-evident that with previously used accumulator chambers there must be a drop of at least a couple of feet from supply container to the burner. In my invention, I have provided for a combination which will measure the oil satisfactorily even though there is only a few inches drop from the supply container to the burner, as I provide for mounting the accumulator chamber at a relatively low level, a construction not heretofore possible. The use of air pressure in the accumulator chamber makes it possible to provide for a sufficient difference in elevation between the chamber and the supply container, a fundamentally necessary requirement of accumulator metering systems. Similarly, as stated above, this air pressure is also highly desirable when the flow of oil to the burner must be speeded up, even though it might flow to some extent by gravity or other means in this line.

Having thus described my invention what I claim for Letters Patent is:

1. The combination with a liquid fuel metering apparatus comprising a supply tank, fuel directing means including a conduit for conveying the fuel from said tank to a point of use, and a flow meter interposed in the conduit for measuring and indicating the quantity of fuel conveyed therethrough; of a chamber interposed in said conduit between the meter and the point of use, and having a fuel outlet port, a fuel inlet port, a valve controlling the entrance of fuel into said chamber through said inlet port, a float in said chamber, means for causing said valve to be moved to closed and open positions by said float only when said float is moved through a relatively wide range of movement, and an air vent from said chamber; an opening for filling said supply tank with liquid fuel; a cover for said opening to prevent the escape of air from said tank; a source of compressed air; a conduit for conveying compressed air from said source to said tank; and a conduit connecting said supply tank near its uppermost point to said air vent from said chamber, for conveying compressed air between said tank and said chamber; substantially as and for the purpose described.

2. The combination with a liquid fuel metering apparatus comprising a supply tank, fuel directing means including a conduit for conveying the fuel from said tank to a point of use, and a flow meter interposed in the conduit for measuring and indicating the quantity of fuel conveyed therethrough; of a chamber interposed in said conduit below said tank and between the meter and the point of use, and having a fuel outlet port, a fuel inlet port, a valve controlling the entrance of fuel into said chamber through said inlet port, a float in said chamber for controlling said valve, toggle mechanism connecting said float operatively with said valve to snap said valve to closed or open position only at two predetermined positions of said float within said chamber, and an air vent from said chamber; an opening for filling said supply tank with liquid fuel; a cover for said opening to prevent the escape of air from said tank; a source of compressed air; a conduit for conveying compressed air from said source to said tank; and a conduit connecting said supply tank near its uppermost point to said air vent from said chamber, for conveying compressed air between said tank and said chamber; substantially as and for the purpose described.

ROBERT S. BASSETT.